(12) United States Patent
Nishimura

(10) Patent No.: US 7,573,786 B2
(45) Date of Patent: Aug. 11, 2009

(54) OPTICAL DISK APPARATUS AND ROTATION SPEED CONTROL METHOD THEREOF

(75) Inventor: Yuzo Nishimura, Chiba (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 347 days.

(21) Appl. No.: 11/060,875

(22) Filed: Feb. 18, 2005

(65) Prior Publication Data

US 2005/0265179 A1   Dec. 1, 2005

(30) Foreign Application Priority Data

May 28, 2004   (JP)   ............................. 2004-159272

(51) Int. Cl.
G11B 21/08   (2006.01)
(52) U.S. Cl. .................... 369/30.17; 369/47.4
(58) Field of Classification Search ............... 369/47.1, 369/47.4, 47.36, 53.37, 47.38, 47.55
See application file for complete search history.

(56) References Cited

U.S. PATENT DOCUMENTS

| | | | |
|---|---|---|---|
| 5,883,866 A | | 3/1999 | Shimizume et al. |
| 6,226,245 B1 * | | 5/2001 | Fueki .......................... 369/53.3 |
| 6,975,572 B2 * | | 12/2005 | Matsumoto ............... 369/47.53 |
| 2004/0027941 A1 * | | 2/2004 | Chen et al. ................. 369/47.4 |
| 2006/0023592 A1 * | | 2/2006 | Hagiwara et al. ......... 369/47.53 |
| 2006/0072408 A1 * | | 4/2006 | Chiu et al. ............... 369/47.51 |
| 2006/0072899 A1 * | | 4/2006 | Van Beckhoven et al. ..... 386/68 |
| 2006/0109762 A1 * | | 5/2006 | Blacquiere ............... 369/47.38 |

FOREIGN PATENT DOCUMENTS

CN   1182266 A   5/1998

(Continued)

OTHER PUBLICATIONS

State Intellectual Property Office of China (SIPO) office action dated Nov. 2, 2007 for patent application CN2005-100730700.

*Primary Examiner*—Joseph H Feild
*Assistant Examiner*—Henok G Heyi
(74) *Attorney, Agent, or Firm*—Townsend and Townsend and Crew LLP

(57) ABSTRACT

An optical disk apparatus is disclosed which can suppress excessive reduction of recording speed on the inner side of a disk and that can assure quick response of accessing operation. When, at the time of access, a write or read operation is performed while returning to a second disk radial position that is located inside a first disk radial position, based on a positional relationship of the first and second disk radial positions with respect to a reference radial position, the rotation control method of the optical disk at the second disk radial position is selected out of a constant linear velocity method and a constant angular velocity method so that, if a user disk area is relatively small and located only on the inner side, writing or reading velocity on the inner side is not reduced or, if the user disk area is relatively large and located both on the inner and outer sides, writing or reading velocity on the outer side is not reduced and, at the time of access, regardless of the size of the user data area, the variation of rotation speed of a disk motor at the second disk radial position is suppressed and quick response is assured.

13 Claims, 3 Drawing Sheets

FOREIGN PATENT DOCUMENTS

| | | |
|---|---|---|
| JP | 07-312018 A | 11/1995 |
| JP | 10-031863 A | 2/1998 |
| JP | 11-096666 A | 4/1999 |
| JP | 2002-251743 A | 9/2002 |
| JP | 2002-269926 | 9/2002 |

* cited by examiner

OPTICAL DISK APPARATUS AND ROTATION SPEED CONTROL METHOD THEREOF

CROSS-REFERENCES TO RELATED APPLICATIONS

The present application is related to and claims priority from Japanese Patent Application No. 2004-159272, filed May 28, 2004, and is hereby incorporated by reference for all purposes.

BACKGROUND OF THE INVENTION

The present invention relates to an optical disk apparatus and, in particular, it relates to a method for controlling rotation speed of an optical disk when it is accessed.

Examples of the related art related to the present invention include, for example, the technique set forth in Japanese Patent Laid-open No. 2002-269926. This publication describes a technique in that, in the range from the innermost position to a predetermined radial position of an optical disk, the optical disk is rotated using a constant angular velocity method and the write operation is performed according to a write clock of a frequency corresponding to the linear velocity at the write position and, in the range outside the predetermined radial position, the optical disk is rotated using a constant linear velocity method and the write operation is performed according to a write clock of a constant frequency corresponding to the linear velocity of the rotation.

In the related art described above, based on the fact that the write operation is performed while the optical disk is rotated using the constant angular velocity method from the innermost position to the predetermined radial position of the optical disk, for example, even when the access point is moved further inward from a position inside the predetermined radial position, the write operation is performed while the optical disk is rotated using the constant angular velocity method. Therefore, the recording velocity on the inner side of the disk is reduced.

BRIEF SUMMARY OF THE INVENTION

In view of the circumstances of the related art described above, it is desirable to prevent recording velocity at an inner side of an optical disk from being reduced excessively at the time of access in an optical disk apparatus and to suppress the difference of rotation speed between the inner side and the outer side so that quick response of the accessing operation can be assured.

In an optical disk apparatus of the present invention, when, at the time of access, a write or read operation is performed while returning to a second disk radial position (the disk radial position to be accessed (the target)) that is located further inside a first disk radial position (the outermost disk radial position of a user data area recorded on an optical disk), if the first disk radial position is located on the outer side of the disk with respect to a reference radial position and the second disk radial position is located on the inner side of the disk with respect to the reference radial position, the rotation of the optical disk is switched from a constant linear velocity (CLV) method to a constant angular velocity (CAV) method.

On the other hand, if both of the first and second disk radial positions are located at or inside the reference radial position or located at or outside the reference radial position, the optical disk is rotated still using the constant linear velocity method. As a result, the difference of rotation speed of the optical disk between the first disk radial position and the second disk radial position can be suppressed and the write and read operation can be started in a short time.

According to the present invention, at the time of access in an optical disk apparatus, the need to excessively reduce the recording velocity on the inner side of the optical disk can be eliminated and the difference of rotation speed between the inner side and the outer side can be suppressed and, moreover, quick response of the access can be assured.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE INVENTION

Hereinafter, a best mode for carrying out the present invention will be described with reference to the drawings.

Figure 1:
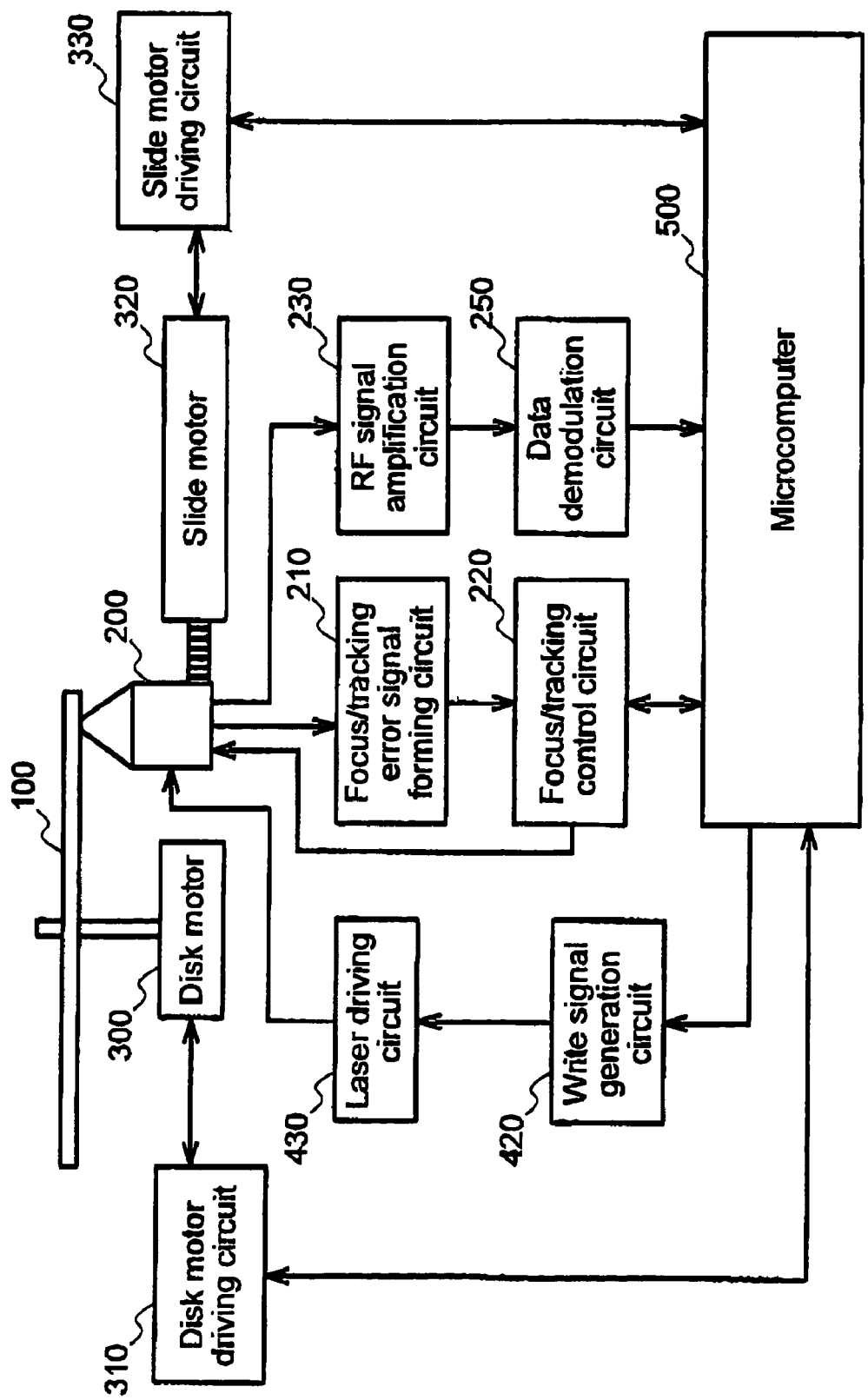
FIG. 1 is an exemplary block diagram of an optical disk apparatus provided as an embodiment of the present invention.

FIG. 1 shows: an optical disk 100; a disk motor 300 for rotatably driving the optical disk 100; a disk motor driving circuit 310 that acts as disk motor driving circuit for driving the disk motor 300; an optical pickup 200 for applying laser light to the optical disk 100 and receiving reflected laser light; a focus/tracking error signal forming circuit 210 for forming a focus error signal or a tracking error signal based on a signal reproduced from the reflected laser light in the optical pickup 200; a focus/tracking control circuit 220 for forming a control signal to control an objective lens (not shown) in the optical pickup 200 based on the output of the focus/tracking error signal forming circuit 210; a laser driving circuit 430 for driving a laser diode in the optical pickup 200 based on a write signal; a write signal generation circuit 420 for generating the write signal; an RF signal amplification circuit 230 for amplifying an RF signal reproduced from the reflected laser light in the optical pickup 200; a data demodulation circuit 250 for demodulating the amplified RF signal; a slide motor 320 for moving the optical pickup 200 in the radial direction of the optical disk 100; a slide motor driving circuit 330 for controllably driving the slide motor 320; and a microcomputer 500 that acts as control circuit for controlling the disk motor driving circuit 310, the write signal generation circuit 420, the focus/tracking control circuit 220 and the slide motor driving circuit 330.

In the configuration described above, user data (information) is written while the optical pickup 200 is moved from the inner side to the outer side of the optical disk 100. At this time, the optical disk 100 is rotated by the disk motor 300 using a constant linear velocity method so that the information is recorded on a recording surface of the optical disk 100 at a constant recording velocity. The microcomputer 500 allows the disk motor 300 to rotate at a given speed via the disk motor driving circuit 310.

At the time of access, a write or read operation is performed while returning from a first disk radial position of the optical disk 100 on which the information is recorded as described above (the outermost disk radial position of the user data area recorded on the optical disk) to a second disk radial position that is located further inside the first disk radial position (the disk radial position to be accessed (the target)). In other words, the write or read operation is performed while moving the optical pickup 200 from the first disk radial position to the second disk radial position. In this case, the microcomputer 500 determines whether the first and second disk radial positions are located on the outer or inner side of the disk with respect to a predetermined reference radial position. As a result of the determination, when the first disk radial position is located on the outer side of the disk with respect to the reference radial position and the second radial position is located on the inner side of the disk with respect to the reference radial position, the microcomputer 500 controls the disk motor driving circuit 310 to switch the rotation control method of the optical disk 100 by the disk motor 300 from the constant linear velocity method to a constant angular velocity method.

On the other hand, as a result of the determination, when both of the first and second disk radial positions are located at or inside the reference radial position or located at or outside the reference radial position, the microcomputer 500 does not switch the rotation control method of the optical disk 100 to the constant angular velocity method but still allows the optical disk to rotate using the constant linear velocity method.

When the control state is switched to the constant angular velocity method as a result of the determination, the rotation speed of the optical disk 100 according to the constant angular velocity method, to which the control state is switched, is set to a predetermined value. In the state in which the optical pickup 200 is moved to the second radial position and the optical disk 100 is rotating using the constant angular velocity or constant linear velocity method, the focus and tracking of the objective lens in the optical pickup 200 is controlled by the microcomputer 500 via the focus/tracking control circuit 220 and an actuator (not shown) and, in such controlled state, the write or read operation is started.

As described above, by suppressing the difference of the rotation speed (angular speed) of the optical disk 100 between the first disk radial position and the second disk radial position or, in other words, by suppressing the difference of the rotation speed (angular speed) of the disk motor 300 between the two disk radial positions, the write or read operation at the time of access can be started in a short time and, thus, quick response of the accessing operation can be assured. The microcomputer 500 determines the first and second disk radial positions using radial positional information about the first and second disk radial positions such as an amount of written information at the first and second disk radial positions and information about the rotation speed of the disk motor or optical disk. Here, the reference radial position mentioned above is set to an appropriate value in advance based on the conditions of the servo system such as torque characteristics of the disk motor 300, the inertia of the body of rotation and the like.

Figure 2A:
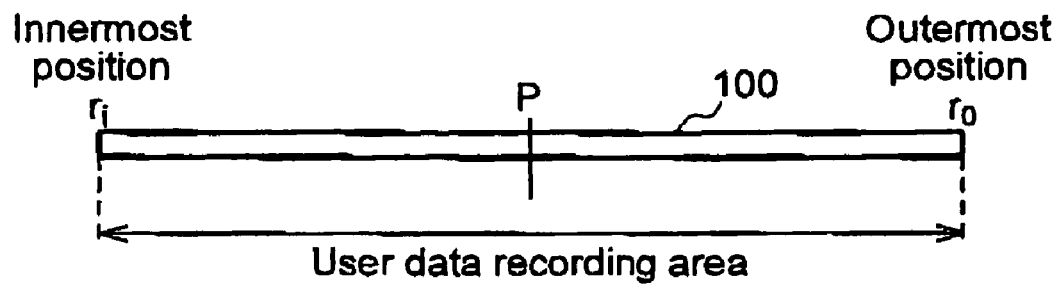
FIGS. 2A to 2C are diagrams for describing disk rotation control when the disk is accessed in the optical disk apparatus of FIG. 1.
Figure 2B:
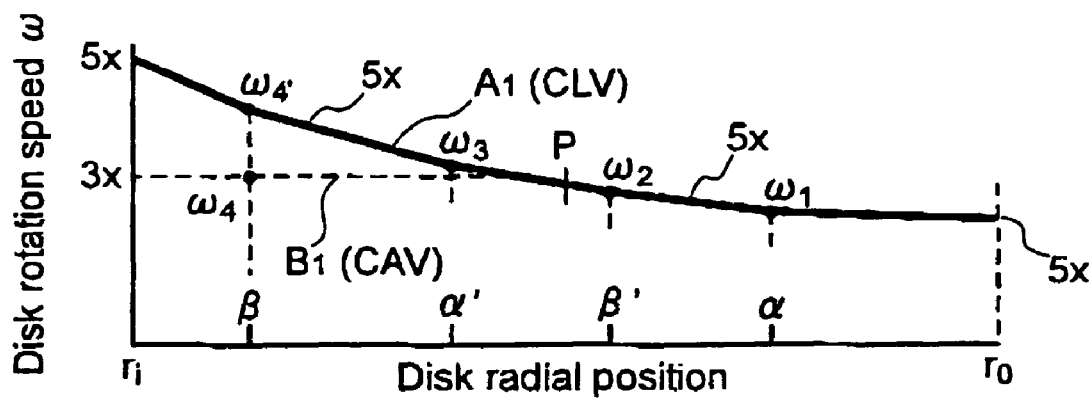
Figure 2C:
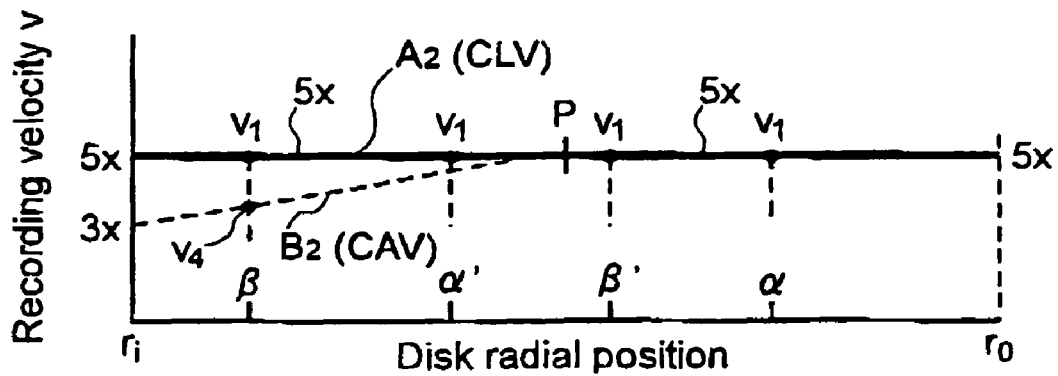
Figure 3:
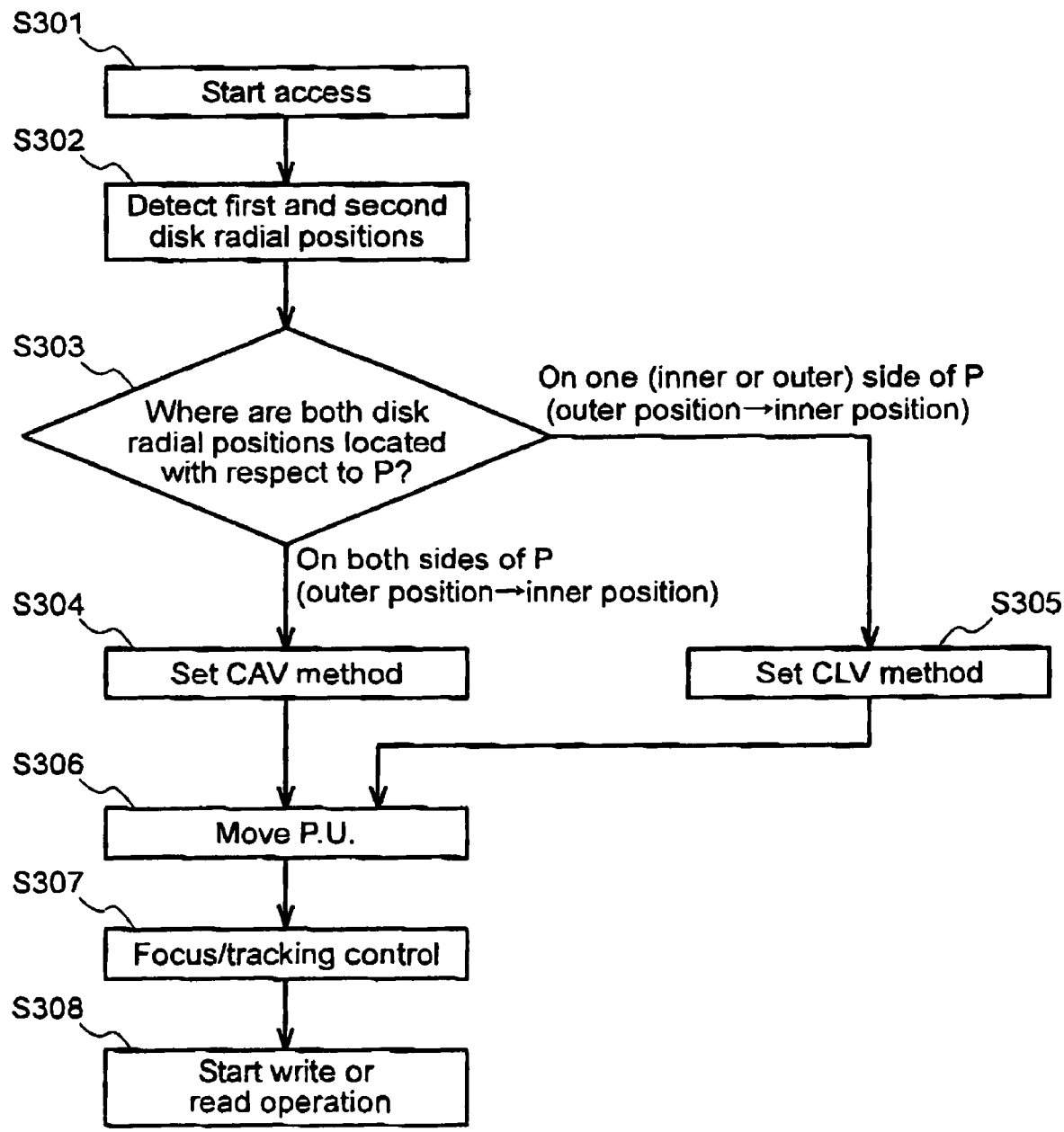
FIG. 3 is a diagram for describing an operational procedure of the optical disk apparatus of FIG. 1 when the disk is accessed.

Hereinafter, the elements of FIG. 1 used in the description of FIGS. 2 and 3 are denoted by the same reference numerals as those in FIG. 1.

FIGS. 2A to 2C are diagrams for describing disk rotation control when the disk is accessed in the optical disk apparatus of FIG. 1. FIGS. 2A to 2C illustrate the case when the write operation is performed through the accessing operation. FIG. 2A is a radial cross-sectional view of the optical disk 100, FIG. 2B is a diagram showing a relationship between the disk radial position where the data is written and the rotation speed of the optical disk 100 (disk rotation speed), and FIG. 2C is a diagram showing a relationship between the disk radial position where the data is written and the recording velocity.

In FIGS. 2A to 2C, $r_i$ designates the innermost disk radial position of a user data recording area of the optical disk 100. $r_o$ designates the outermost disk radial position of the user data recording area. P designates the reference radial position. $A_1$ shows characteristics of the disk rotation speed in the case of 5× speed recording using the constant linear velocity method (CLV recording). $B_1$ shows characteristics of the disk rotation speed in the case of recording with the 3× speed rotation using the constant angular velocity method (CAV recording). $A_2$ shows characteristics of the recording velocity in the case of the 5× speed recording using the constant linear velocity method (CLV recording). $B_2$ shows characteristics of the recording velocity in the case of recording with 3× speed rotation using the constant angular velocity method (CAV recording). $\alpha$ designates the first disk radial position on the outer side of the disk with respect to the reference radial position P. $\alpha'$ designates the first disk radial position on the inner side of the disk with respect to the reference radial position P. $\beta$ designates the second disk radial position on the inner side of the disk with respect to the reference radial position P. $\beta'$ designates the second disk radial position on the outer side of the disk with respect to the reference radial position P.

The user data (information) is initially recorded while moving the optical pickup 200 from the innermost disk radial position $r_i$ of the optical disk 100 toward the outermost disk radial position $r_o$. At this time, the optical disk 100 rotates at the 5× speed using the constant linear velocity method. When the data is recorded from the innermost disk radial position $r_i$ to the outermost disk radial position $r_o$, the disk rotation speed is gradually reduced as the disk radial position where the data is written is moved toward the outer side of the disk (the characteristics $A_1$) while the recording velocity remains constant regardless of the disk radial position (the characteristics $A_2$).

When, at the time of access, the write or read operation is performed while returning from the first disk radial position $\alpha'$ on the inner side of the disk with respect to the reference radial position P to the second disk radial position $\beta$ further inside the first disk radial position $\alpha'$, the microcomputer 500 determines that both of the first radial position $\alpha'$ and the second disk radial position $\beta$ are located on the inner side of the disk with respect to the reference radial position P. As a result of the determination, the microcomputer 500 controls the disk motor driving circuit 310 so that the optical disk 100 continues to rotate at the 5× speed using the constant linear velocity method. At the 5× speed using the constant linear velocity method, the disk rotation speed at the second disk radial position $\beta$ is $\omega_4'$ and the recording velocity remains to be $v_1$ without any change. There is little difference ($\omega_4'-\omega_3$) between the disk rotation speed $\omega_4'$ and the disk rotation speed $\omega_3$ at the first disk radial position $\alpha'$. Therefore, in this case, the disk motor 300 has a short servo pull-in time and, at the second disk radial position $\beta$, the write operation can be started quickly after the focus/tracking control.

Further, when, at the time of access, the write or read operation is performed while returning from the first disk radial position $\alpha$ to the second disk radial position $\beta'$ on the outer side of the disk with respect to the reference radial position P, the microcomputer 500 determines that the first disk radial position $\alpha$ is located on the outer side of the disk with respect to the reference radial position P and the second disk radial position $\beta'$ is also located on the outer side of the disk with respect to the reference radial position P. As a result of the determination, the microcomputer 500 controls the disk motor driving circuit 310 so that the rotation control method of the optical disk 100 is not switched to the 3× speed constant angular velocity method but the optical disk 100 continues to rotate at the 5× speed using the constant linear velocity method. At the 5× speed using the constant linear velocity method, the disk rotation speed at the second disk radial position β' is $\omega_2$ and the recording velocity remains to be $v_1$ without any change. There is little difference ($(\omega_2-\omega_1)$) between the disk rotation speed $\omega_2$ and the disk rotation speed $\omega_1$ at the first disk radial position α. Therefore, also in this case, the disk motor 300 has a short servo pull-in time and, at the second disk radial position β', the write operation can be started quickly after the focus/tracking control.

Still further, when, at the time of access, the write or read operation is performed while returning from the first disk radial position α on the outer side of the disk with respect to the reference radial position P to the second disk radial position β on the inner side of the disk with respect to the reference radial position P, the microcomputer 500 determines that the first disk radial position α is located on the outer side of the disk with respect to the reference radial position P and the second disk radial position β is located on the inner side of the disk with respect to the reference radial position P. As a result of the determination, the microcomputer 500 controls the disk motor driving circuit 310 to switch the rotation control method of the optical disk 100 to the 3× speed constant angular velocity method. At the 3× speed using the constant angular velocity method after the switching, the disk rotation speed is constant regardless of the disk radial position (the characteristics $B_1$) and the recording velocity is increased proportional to the outward movement of the disk radial position (the characteristics $B_2$).

As a result of the switching to the 3× speed constant angular velocity method, at the second disk radial position β, the disk rotation speed is $\omega_4$ and the recording velocity is $v_4$. There is little difference ($\omega_4-\omega_1$) between the disk rotation speed $\omega_4$ at the second disk radial position β after switching the rotation control method and the disk rotation speed $\omega_1$ at the first disk radial position α before switching the rotation control method. Therefore, the disk motor 300 has a short servo pull-in time and, at the second disk radial position β, the write operation can be started quickly after the focus/tracking control. In this connection, when the rotation control method of the optical disk 100 is switched to the 3× speed constant angular velocity method, the microcomputer 500 controls the write signal generation circuit 420 to adjust the frequency of the write clock so as to assure the recording velocity $v_1$ of the 5× speed constant linear velocity method at the reference radial position P.

Though the disk rotation control when the write operation is performed at the time of access is described above with reference to FIGS. 2A to 2C, it is to be noted that the disk rotation control when the read operation is performed at the time of access is basically similar to that described above.

FIG. 3 is a diagram for describing an operational procedure of the optical disk apparatus of FIG. 1 when the disk is accessed.

In FIG. 3, (1) First, the microcomputer 500 issues an instruction signal so that the optical disk apparatus starts accessing operation (step S301);

(2) The microcomputer 500 detects the current disk radial position of the optical pickup 200 or the first disk radial position and the disk radial position to which the optical pickup 200 moves for accessing or the second disk radial position (step S302);

(3) The microcomputer 500 compares information about the both detected disk radial positions with information about a predetermined reference radial position and determines the positional relationship of the both disk radial positions with respect to the reference radial position (step S303);

(4) As a result of the determination, when both of the first disk radial position and the second disk radial position are located at or inside the reference radial position or located at or outside the reference radial position, the microcomputer 500 does not switch the rotation control method of the optical disk 100 but still allows the optical disk 100 to rotate in the current constant linear velocity method (step S305);

On the other hand, as a result of the determination, when the first disk radial position is located on the outer side of the disk with respect to the reference radial position and the second disk radial position is located on the inner side of the disk with respect to the reference radial position, the rotation control method of the optical disk 100 is switched from the current constant linear velocity method to the constant angular velocity method (step S304);

(5) When the rotation control method of the optical disk 100 is set to the constant angular velocity method in step S304 above, the optical pickup 200 is moved toward the second disk radial position of the optical disk 100 and the optical disk 100 is rotated using the constant angular velocity method (step S306);

On the other hand, when the rotation control method of the optical disk 100 is set to the constant linear velocity method in step S305 above, the optical pickup 200 is moved toward the second disk radial position of the optical disk 100 and the optical disk 100 is rotated still using the constant linear velocity method (step S306);

(6) The focus/tracking control of the objective lens in the optical pickup 200 is performed (step S307); and (7) The write or read operation is started at the second disk radial position (step S308).

According to the embodiment of the present invention described above, the need to excessively reduce the recording velocity on the inner side of the optical disk can be eliminated and the difference of rotation speed between the inner side and the outer side can be suppressed.

What is claimed is:

1. An optical disk apparatus comprising:
   a disk motor for rotatably driving an optical disk;
   a disk motor driving circuit for driving said disk motor; and
   a controller for controlling said disk motor to control an angular velocity of said optical disk in accordance with a current position of a current I/O operation and a target position of a next I/O operation, said current position being closer to a rim of said optical disk than said target position;
   when said current position and said target position are located on a first side of a predetermined reference radial position, said controller controls said disk motor in a constant linear velocity mode of said optical disk; and
   when said current position and said target position are located on a second side of said predetermined reference radial position other than the first side, said controller controls said disk motor in a constant linear velocity mode of said optical disk; and
   when said current position is located between the rim of said optical disk and said predetermined reference radial position and if said target position is located between said predetermined reference radial position and an axis of rotation of said optical disk, said controller controls said disk motor in a constant angular velocity mode of said optical disk.

2. The apparatus of claim 1, wherein said controller controls said disk motor in a constant angular velocity mode of said optical disk when said current position is between the rim of said optical disk and said predetermined reference radial position and said target position is between said predetermined reference radial position and the axis of rotation of said optical disk.

3. The apparatus of claim 1 wherein said controller initially operates the apparatus in a constant linear velocity mode of said optical disk when performing I/O operations.

4. The apparatus of claim 1
wherein said controller controls said disk motor in a constant linear velocity mode of said optical disk when both of said current position and said target position are located between the rim of said optical disk and said predetermined reference radial position or when both of said current position and said target position are located between said predetermined reference radial position and the axis of rotation of said optical disk.

5. A method of operating an optical disk apparatus comprising:
rotating an optical disk;
performing a first I/O operation at a first radial position;
performing a second I/O operation at a second radial position subsequent to said first I/O operation, said second radial position and said first radial position being located on the same side of a predetermined reference radial position, wherein an angular velocity of said optical disk is adjusted so that said second I/O operation is performed in a constant linear velocity mode of said optical disk; and
performing a third I/O operation at a third radial position subsequent to said second I/O operation, said third radial position and said second radial position being located on opposite sides of said predetermined reference radial position, wherein the angular velocity of said optical disk is adjusted so that said third I/O operation is performed in a constant angular velocity mode of said optical disk;
wherein said first radial position is closer to the rim of said optical disk than said second radial position, and said second radial position is closer to the rim of said optical disk than said third radial position.

6. The method of claim 5, wherein an I/O operation subsequent to said third I/O operation is performed in said constant angular velocity mode of said optical disk.

7. The method of claim 6, wherein the radial position of said subsequent I/O operation is located between said third radial position and said predetermined reference radial position.

8. The method of claim 5, wherein said first radial position and said second radial position are both located between the rim of said optical disk and said predetermined reference radial position.

9. The method of claim 8, wherein said second radial position is located between the rim of said optical disk and said predetermined reference radial position and said third radial position is located between said predetermined reference radial position and an axis of rotation of said optical disk.

10. The method of claim 5, wherein said second radial position is located between the rim of said optical disk and said reference radial position and said third radial position is located between said predetermined reference radial position and an axis of rotation of said optical disk.

11. The method of claim 5, further comprising initially performing I/O operations in a constant linear velocity mode of said optical disk.

12. A method of operating an optical disk apparatus comprising:
performing a first operation by recording or reproducing first data beginning at an innermost radial position of a recording area of an optical disk and ending at a first radial position of said recording area, said first radial position being located between the rim of said optical disk and a predetermined reference radial position, in a constant linear velocity mode of said optical disk;
performing access to a second radial position of the recording area of said optical disk from said first radial position;
performing a second operation subsequent to said first operation by recording or reproducing second data beginning at said second radial position, said second radial position being located between said predetermined reference radial position and an axis of rotation of said optical disk in a constant angular velocity mode of said optical disk.

13. An optical disc apparatus comprising:
a disk motor for rotatably driving an optical disk;
a disk motor driving circuit for driving said disk motor;
an optical pickup for exchanging data with said optical disk, including recording to said optical disk or reproducing data from said optical disk; and
a controller for controlling said disk motor,
wherein said controller is operable to perform a first operation, a second operation subsequent to said first operation, and a third operation subsequent to said second operation,
wherein said first operation is performed by recording or reproducing data beginning at an innermost radial position of a recording area of said optical disk and ending at a first radial position of said recording area, said innermost radial position and said first radial position being located between a rim of said optical disk and a predetermined reference radial position, said first operation is performed in a constant linear velocity mode of said optical disk,
wherein said second operation is performed by moving said optical pickup from said first radial position to a second radial position, said second radial position being located between said predetermined reference radial position and an axis of rotation of said optical disk, and
wherein said third operation is performed by moving said optical pickup from said second radial position between said predetermined reference radial position and the axis of rotation of said optical disk to a third radial position between the rim of said optical disk and said predetermined reference radial position, said third operation is performed in a constant linear velocity mode of said optical disk.

* * * * *